Oct. 16, 1951  R. D. GRIFF  2,571,441
STALK CUTTER
Filed July 20, 1946  2 Sheets-Sheet 1
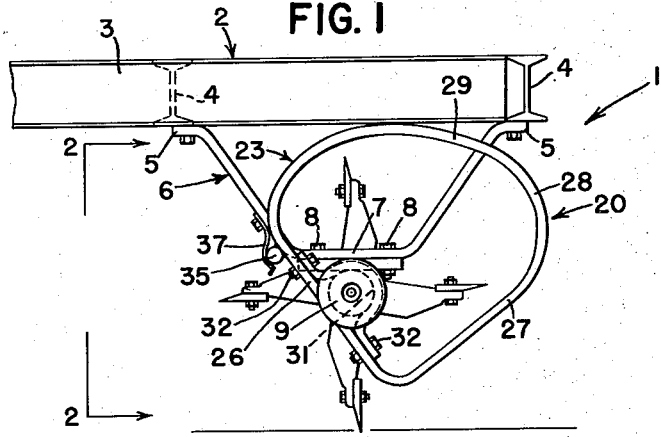
FIG. 1
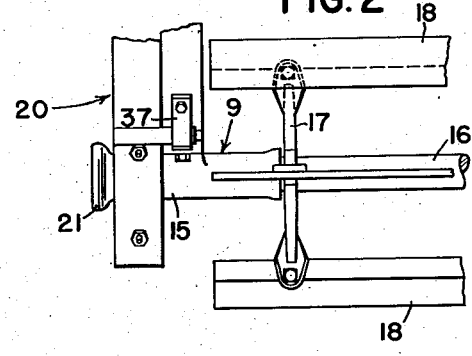
FIG. 2
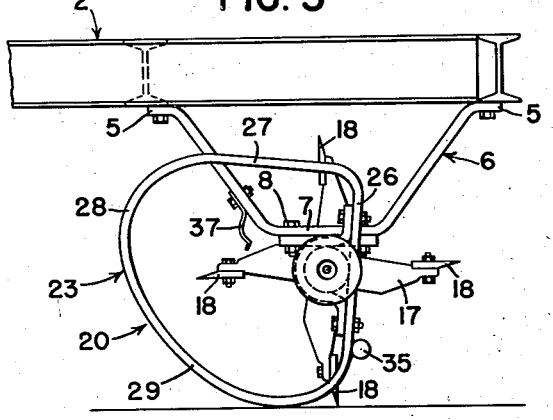
FIG. 3
INVENTOR
ROBERT D. GRIFF
BY 
ATTORNEYS Oct. 16, 1951 R. D. GRIFF 2,571,441
STALK CUTTER
Filed July 20, 1946 2 Sheets-Sheet 2

INVENTOR
ROBERT D. GRIFF
BY
ATTORNEYS

Patented Oct. 16, 1951

2,571,441

UNITED STATES PATENT OFFICE 2,571,441

STALK CUTTER

Robert D. Griff, Rock Island, Ill., assignor to Deere & Company, Moline, Ill., a corporation of Illinois Application July 20, 1946, Serial No. 685,223

2 Claims. (Cl. 55—61)

1

The present invention relates generally to agricultural implements and more particularly to stalk cutter and similar machines.

The object and general nature of the present invention is the provision of new and improved means for supporting the implement for transport with the ground engaging elements or tools held out of working position. More specifically, it is a feature of this invention to provide a stalk cutter with a pair of pivotally mounted transport skids easily swingable into and out of a transport position, supporting the cutting knives in an elevated position but without requiring that the machine be lifted manually, turned over or upended, or otherwise manipulated where great manual effort would be required.

Specifically, it is a feature of this invention to provide a pair of swingable transport skids carried by the stalk cutter and normally held in an upper or inoperative position, but swingable manually down into engagement with the ground whereupon further forward travel of the stalk cutter rolls the transport skids into a transporting position in which the knife element is held above the ground surface. More specifically, it is a feature of this invention to provide transport skids with a non-circular cam periphery whereby, when the skids are first swung down into engagement with the ground, the contact with the ground will cause the skids to roll and, with a progressive action, raise the rear end of the stalk cutter and lift the knife out of engagement with the ground. Preferably, the non-circular cam sections of the swingable skids are arranged so that the skids will not be pushed bodily forwardly when they are lowered into contact with the ground but will grip the ground and raise the implement smoothly, easily and quickly.

It is a further feature of this invention to provide each transport member with an abutment stop cooperating with the bearing brackets of the stalk cutter for determining both the transport and raised positions of the skids.

These and other objects and advantages of the present invention will be apparent to those skilled in the art after a consideration of the following detailed description, taken in conjunction with the accompanying drawings, in which:

Figure 1 is a side view of a stalk cutter in which the principles of the present invention have been incorporated, the stalk cutter being shown in its working position, with the transport members in their inoperative or raised position;

Figure 2 is a fragmentary view taken generally along the line 2—2 of Figure 1;

2

Figure 4:
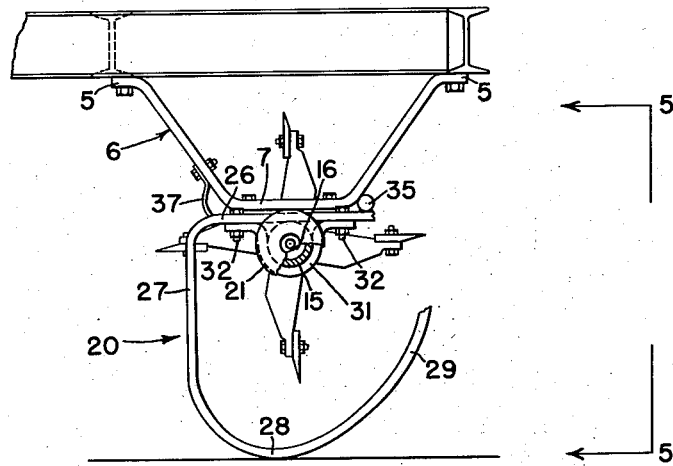
Figure 5:
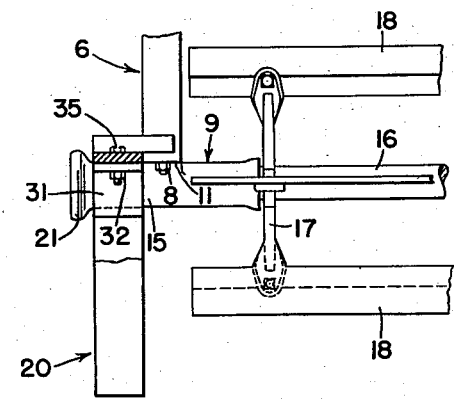

Figure 3 is a view similar to Figure 1, showing the transport skids in the position they occupy when first engaging the ground and starting to raise the knives out of contact with the ground;

Figure 4 is a view similar to Figure 3, showing the implement in its fully raised position; and Figure 5 is a fragmentary view taken generally along the line 5—5 of Figure 4.

Referring now to the drawings, particularly Figure 1, the reference numeral 1 indicates a stalk cutter of well known construction, including a frame 2 made up of generally longitudinally extending channels or angles 3 and generally transverse channels or angles 4. A bracket 6 is fixed to the rear portion of each of the longitudinal frame beams 3, each bracket including a generally U-shaped member having its ends 5 secured to the underside of the associated beam and its central section 7 apertured to receive a pair of bolts 8 by which a shaft bearing member 9 is secured in place. Each bearing member 9 is formed with apertured lugs 11 receiving the attaching bolts 8. As best shown in Figure 2, each of the bearing members includes a generally cylindrical section 15 extended laterally outwardly beyond the associated bearing bracket 6, the latter being mounted adjacent the side of the frame 2. A shaft 16 is mounted for rotation in the bearing members 9 and carries spiders 17 on the arms of which stalk cutting elements in the form of knives 18 are fixed in any suitable manner.

For transporting the stalk cutter I provide a pair of swingable transport skids 20 rockably mounted on the laterally outwardly extended portions 15 of the bearing members 9. Each bearing member includes a laterally outwardly flanged section 21 which serves to hold the associated skid 20 against laterally outward displacement. The transport skid member 20 comprises a relatively heavy strap or bar 23 bent into the shape best shown in Figures 1 and 2. Each bar is shaped to provide a relatively flat section 26, a generally vertical front section 27, a supporting section 28, and a curved section 29 connecting sections 26 and 28. The curved section 29 is formed as a non-circular cam for a purpose which will be explained below. An attaching member 31 encircles the bearing section 15 and is secured, as by bolts 32, to the flat section 26 of the transport skid. An abutment stop 35, preferably in the form of a short section of pipe or shaft, is welded to the rearward portion of the flat skid section 26 and, as best shown in Figures 3 and 4, extends laterally inwardly so as to engage the adjacent portion of the associated bracket 6. Thus, when the transport members 20 are in their transporting position, the abutment stop 35 engages the rear side of the bracket 6, and when the stalk cutter is in operating position, the abutment stop member 35 engages the forward side of the associated bracket 6. In this position, the skid is releasably held in its inoperative position by a spring clip 37 secured, as by a bolt or rivet 38, to the front side portion of the associated bearing bracket 6.

In operation, the two transport skids 20 support the weight of the rear portion of the stalk cutter and hold the knives 18 out of contact with the ground. When the transport skids are swung into their non-working position, as shown in Figure 2, the skids 20 are held out of engagement with the ground.

After finishing up a field and assuming that it is desired to move along the road, lane or the like, the operator dismounts from the tractor and manually releases each skid from its spring 37 and rocks the skid down into engagement with the ground, the parts taking the position shown in Figure 3. In this position, it will be noted that the non-circular cam section 29 of each skid element 20 engages the ground so that when the operator drives forwardly, the skids 20 will be caused to roll along the ground surface, and since the portions of the cam section 29 contacting the ground are disposed at progressively increasing distances from the axis of pivoting of the transport skid, it will be seen that as the implement is drawn forwardly the rear end will be raised smoothly by the forward rolling of the skids 20, with little tendency for the members 20 to skid along the ground surface, until they are rotated into the position shown in Figure 4, in which position the abutment stops 35 come up against the rear side of the associated bearing brackets 6. It will be noted, also, that when the transport members 20 are in their inoperative position, shown in Figure 1, the center of gravity of each member is to the right or rearwardly of the axis of rotation, and hence the members 20 remain in their raised position and do not become disengaged therefrom by jarring or vibration, the spring clips 37 serving to hold the members 20 against accidental displacement.

While I have shown and described above the preferred structure in which the principles of the present invention have been incorporated, it is to be understood that my invention is not to be limited to the particular details shown and described above, but that, in fact, widely different means may be employed in the broader aspects of my invention.

What I claim, therefore, and desire to secure by Letters Patent is:

1. An agricultural machine comprising a frame, a pair of brackets fixed thereto, a pair of ground engaging members rotatably mounted on said brackets, each of said members being swingable between upper and lower positions relative to the frame, an abutment carried by each of said pivoted members and each adapted to engage one side of said bracket when the implement is to be transported and to engage the other side of the bracket when the members are pivoted into a working position, the abutment on each member being located thereon so that the center of gravity thereof lies at the side of its axis of rotation opposite said other side of the associated bracket, whereby said member is normally retained thereby out of engagement with the ground until it is rotated in a direction to carry the center of gravity to a point on the other side of said axis.

2. A stalk cutter comprising a frame having a pair of depending brackets fixed to opposite sides of said frame, laterally outwardly extending parts carried by said brackets, a pair of supports swingably mounted on the outer portions of said laterally outwardly extending parts, and an abutment member carried on each of said swingable members and adapted to engage one portion of the associated bracket for determining the lowered position of the associated swingable member, each of said swingable members being shaped so as to be overbalanced in its raised position, and means on each bracket disposed thereon in a position to act against the associated abutment member for holding the associated swingable member in said overbalanced position out of contact with the ground.

ROBERT D. GRIFF.

REFERENCES CITED

The following references are of record in the file of this patent:

UNITED STATES PATENTS

| Number | Name | Date |
|---|---|---|
| 1,083,428 | Boals | Jan. 6, 1914 |
| 1,198,846 | Huncker | Sept. 19, 1916 |
| 1,201,932 | Bullard | Oct. 17, 1916 |

FOREIGN PATENTS

| Number | Country | Date |
|---|---|---|
| 184,380 | Great Britain | Aug. 17, 1922 |